US006598788B1

(12) United States Patent
Dabrowski

(10) Patent No.: US 6,598,788 B1
(45) Date of Patent: Jul. 29, 2003

(54) METHOD AND APPARATUS FOR SCRIP DISTRIBUTION AND MANAGEMENT

(76) Inventor: Stanley P. Dabrowski, 2801 Deep Water Cir., Las Vegas, NV (US) 89117

( * ) Notice: Subject to any disclaimer, the term of this patent is extended or adjusted under 35 U.S.C. 154(b) by 0 days.

(21) Appl. No.: 09/366,224

(22) Filed: Aug. 3, 1999

Related U.S. Application Data

(60) Provisional application No. 60/095,091, filed on Aug. 3, 1998.

(51) Int. Cl.[7] .................................................. G06F 7/08

(52) U.S. Cl. ........................ 235/381; 235/382; 235/380; 235/462.01; 235/462.15

(58) Field of Search ................................ 235/375, 379, 235/380, 381, 382, 382.5, 487, 462.01, 462.15; 700/231, 232; 705/17, 37; 463/17; 902/12, 13, 14

(56) References Cited

U.S. PATENT DOCUMENTS

| | | | | | |
|---|---|---|---|---|---|
| 5,239,165 | A | * | 8/1993 | Novak | 235/375 |
| 5,290,033 | A | | 3/1994 | Bittner et al. | |
| 5,371,345 | A | * | 12/1994 | LeStrange et al. | 235/380 |
| 5,420,406 | A | | 5/1995 | Izawa et al. | |
| 5,580,311 | A | | 12/1996 | Haste, III | |
| 5,595,538 | A | | 1/1997 | Haste, III | |
| 5,627,356 | A | * | 5/1997 | Takemoto et al. | 235/381 |
| 5,709,603 | A | * | 1/1998 | Kaye | 463/17 |
| 5,772,510 | A | * | 6/1998 | Roberts | 273/138.2 |
| 5,791,990 | A | * | 8/1998 | Schroeder et al. | 463/17 |
| 5,818,026 | A | * | 10/1998 | Melling et al. | 235/487 |
| 5,915,588 | A | * | 6/1999 | Stoken et al. | 221/2 |
| 6,012,832 | A | | 1/2000 | Saunders et al. | 235/380 |
| 6,014,594 | A | * | 1/2000 | Heidel et al. | 700/231 |
| 6,048,269 | A | * | 4/2000 | Burns et al. | 463/25 |
| 6,110,044 | A | * | 8/2000 | Stern | 273/269 |
| 6,128,550 | A | * | 10/2000 | Heidel et al. | 700/232 |
| 6,241,118 | B1 | * | 6/2001 | Tramontina | 221/45 |
| 6,340,331 | B1 | * | 1/2002 | Saunders et al. | 235/380 |
| 6,347,794 | B2 | * | 2/2002 | Scrymgeour et al. | 273/138.1 |

FOREIGN PATENT DOCUMENTS

| | | | |
|---|---|---|---|
| WO | WO 94/16781 | | 8/1994 |
| WO | WO 98/59311 | | 12/1998 |
| WO | 9922350 | * | 5/1999 |

* cited by examiner

*Primary Examiner*—Michael G. Lee
*Assistant Examiner*—Uyen-Chau Le
(74) *Attorney, Agent, or Firm*—Gates & Cooper LLP

(57) ABSTRACT

A method, apparatus, and article of manufacture for dispensing pre-coded scrip is disclosed. The method comprises the steps of accepting a cashout command at a gaming device, scanning a code on the pre-coded scrip in response to the cashout command, transmitting the code to a remote processor having access to a database for storing and retrieving codes from a plurality of gaming devices, receiving a scrip dispense message from the remote processor, and dispensing the pre-coded scrip. The article of manufacture comprises a data storage device tangibly embodying instructions to perform the method steps described above. One embodiment of the apparatus comprises a scanner for scanning a code on a pre-coded scrip, a scrip dispensing unit for emitting or issuing the scrip to the user, and a processor. The processor is communicatively coupled to the gaming device, the scanner, the scrip dispensing unit, and a remote processor which has access to a database for storing and retrieving codes from a plurality of gaming devices. The processor comprises instructions for transmitting a first message comprising the scanned code to the remote processor and for receiving a second message comprising a scrip dispense message from the remote processor.

41 Claims, 10 Drawing Sheets

METHOD AND APPARATUS FOR SCRIP DISTRIBUTION AND MANAGEMENT

CROSS REFERENCE TO RELATED APPLICATIONS

This application claims benefit of U.S. Provisional Application No. 60/095,091, filed Aug. 3, 1998 by Stanley P. Dabrowski and entitled "METHOD AND APPARATUS FOR SCRIP DISTRIBUTION AND MANAGEMENT," which application is hereby incorporated by reference herein.

This application is also related to the following applications, each of which applications are hereby incorporated by reference herein:

Application Ser. No. 09/368,036, filed on same date herewith, by Stanley P. Dabrowski and entitled "METHOD AND APPARATUS FOR MODIFYING GAMING MACHINES TO PROVIDE SUPPLEMENTAL OR MODIFIED FUNCTIONALITY", now U.S. Pat. No. 6,379,246, issued on Apr. 30, 2002;

Application Ser No. 09/368,296, filed on same date herewith, by Stanley P. Dabrowski and entitled "METHOD AND APPARATUS FOR CONTROLLING A COIN HOPPER TO OPERATE WITH A SECONDARY MONETARY EXCHANGE DISPENSER", now U.S. Pat. No. 6,253,119, issued Jun. 26, 2001; and Application Ser No. 09/368,096, filed on same date herewith, by Stanley P. Dabrowski and entitled "SCRIP DISPENSER", now U.S. Pat. No. 6,263,258, issued on Jul. 17, 2001.

BACKGROUND OF THE INVENTION

1. Field of the Invention

The present invention relates to systems and methods for managing currency transactions, and in particular, to an inexpensive system for securely distributing and accepting scrip at numerous widely distributed gaming devices.

2. Description of the Related Art

Recent years have seen a rapid expansion of the gaming industry. Much of the income derived from such games is collected at gaming devices like slot machines and video poker games.

Revenue from such gaming devices can be increased in one of two ways: by increasing the number of transactions or by increasing the average wager per transaction. The number of transactions can be most easily increased simply by increasing the number of available machines. However, increasing the number of gaming devices can be a costly enterprise.

In the past, most gaming machines used coins as a medium of exchange. The machine accepted the wager in coin, and if the player was successful, paid winnings immediately from coin stored in the machine itself. While effective, such coin machines are expensive to maintain. Since the money taken in by the gaming device generally exceeds jackpots paid out, the accumulated money (in coin) must be removed from each machine on a periodic basis. This collection can be difficult, because coins can be heavy and unwieldy.

Recent years have seen a movement away from coin-only machines and a proliferation of gaming machines that also accept currency as a medium of exchange. In fact, currently, 60% or more of gaming machines can accept wagers in currency. Although they represent an improvement from the coin machines of the past, currency-accepting gaming machines have proved to be no panacea. Currency acceptors do not obviate the need to pay out winnings in coin. For example, if the player cashes out with $25.50 remaining in the payout account, the gaming device can only issue winnings in coin (in this case, 104 quarters). Since players will often terminate play at such times, the coinage paid out generally exceeds wager coinage entered into the machine, and a cache of coin in the gaming device must be maintained and frequently replenished.

What is needed is an inexpensive system and method for managing currency transactions that eases collection, reduces the risk of theft, does not negatively influence impulse gaming. What is also needed is a system that can manage transactions which must be made in a combination of different mediums of monetary exchange, including cash, coin, and scrip.

Gaming devices are also rapidly improving, providing the user with an enhanced gaming experience. New gaming devices incorporate secondary games, detailed video displays, and other enhancements. At the same time, because gaming devices are also expensive it is often prohibitive to scrap existing gaming devices in favor of new ones. What is needed is a system and method for modifying existing games to provide new functional capabilities or to alter existing capabilities. What is also needed is a system and method that allows a plurality of gaming devices to be modified so that they may be monitored and controlled from a central location. This will allow gaming machine play and tracking enhancements to be implemented without excessive cost.

SUMMARY OF THE INVENTION

To address the requirements described above, the present invention discloses a method, apparatus, and article of manufacture for dispensing pre-coded scrip.

The method comprises the steps of accepting a cashout command at a gaming device, scanning a code on the pre-coded scrip in response to the cashout command, transmitting the code to a remote processor having access to a database for storing and retrieving codes from a plurality of gaming devices, receiving a scrip dispense message from the remote processor, and dispensing the pre-coded scrip. The article of manufacture comprises a data storage device tangibly embodying instructions to perform the method steps described above.

In one embodiment, the apparatus comprises a scanner for scanning a code on a pre-coded scrip, a scrip dispensing unit for emitting or issuing the scrip to the user, and a processor. The processor is communicatively coupled to the gaming device, the scanner, the scrip dispensing unit, and a remote processor which has access to a database for storing and retrieving codes from a plurality of gaming devices. The processor comprises instructions for transmitting a first message comprising the scanned code to the remote processor and for receiving a second message comprising a scrip dispense message from the remote processor.

In another embodiment, the apparatus comprises a cassette, having a plurality of surfaces forming a cavity therein for storing scrip, and an interface disposed on at least one of the plurality of surfaces, wherein the interface is adapted for releaseably coupling the cassette to the scrip dispensing device.

This system relies on coupons or scrip cards that are inherently worthless and self-authenticating. These coupons are activated and dispensed to the user when a payout is requested, and permanently deactivated when they are re-inserted into a gaming device.

BRIEF DESCRIPTION OF THE DRAWINGS

Referring now to the drawings in which like reference numbers represent corresponding parts throughout.

DETAILED DESCRIPTION OF PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
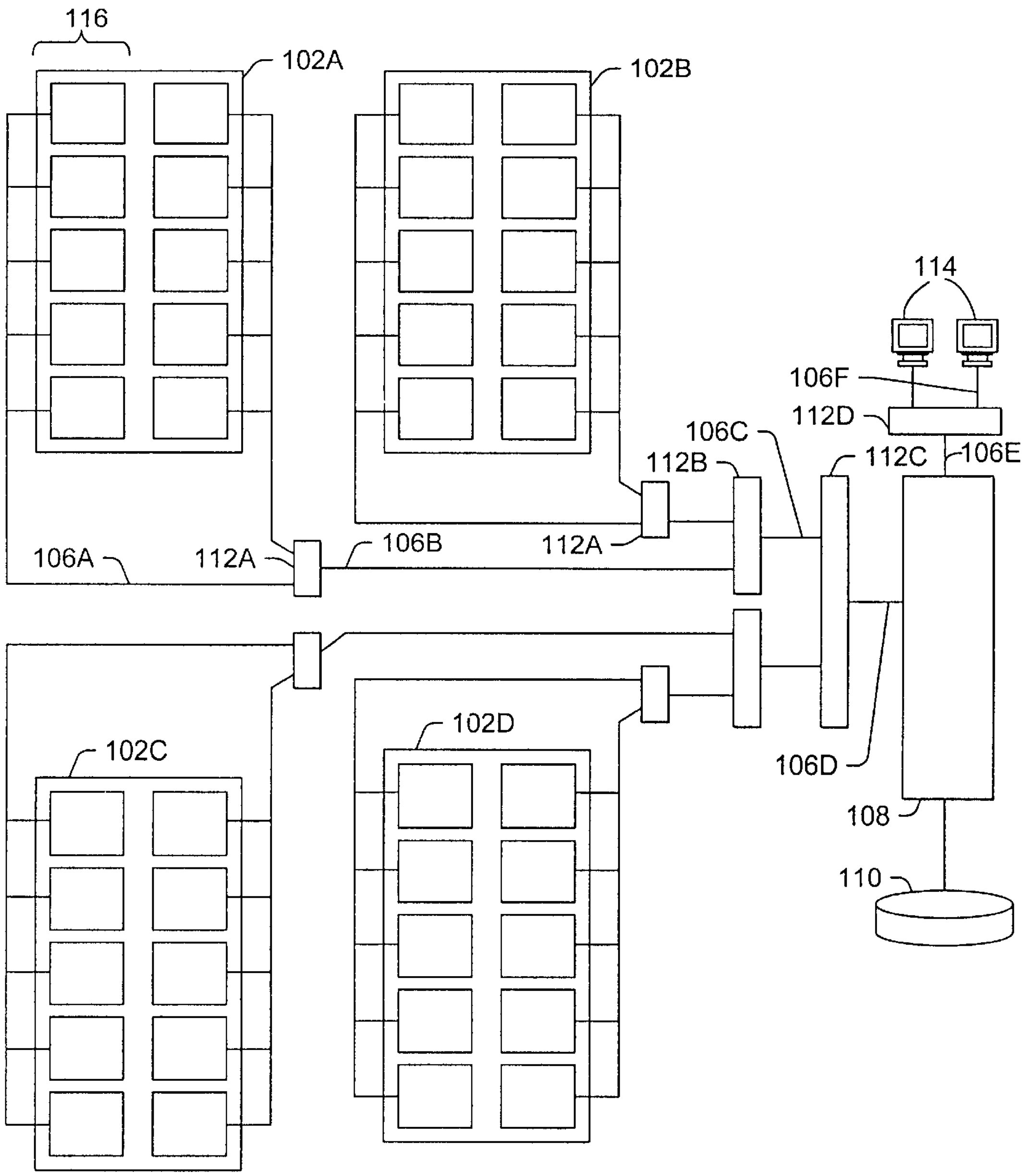
FIG. 1 is a block diagram showing an array of gaming devices.

FIG. 1 is a diagram illustrating a gaming system 100. The gaming system 100 comprises plurality of gaming islands 102A–102D, each having a plurality of gaming devices 104. The gaming devices 104 are operatively coupled to an Intranet server 108 via communication links 106A–106D. In one embodiment, communication link 106A is a 10Base2, 10 Mbps thin coaxial communication link. First hub 112A accepts multiple communication links 106A. Preferably, one cable segment is used per gaming machine bank 116. Communication link 106B is a 10BaseT, 10 Mbps Cat 5 cable which covers an the gaming devices in an island 102A or other sub-area. Second hub 112B accepts multiple communication links 106B. Communication link 106C is a 100BaseFX, 100 Mbps fiber optic link servicing a major area of gaming machines. Third hub 112C accepts multiple communication links 106C, and implements path redundancy and the network backbone. Communication link 106D is a 100BaseT, 100 Mbps Cat 5 cable. The Intranet server 108 is also operatively coupled to a data manager 110 and to workstations 114 via communication links 106E–106F. In one embodiment, the Intranet server 108 is firewall protected, and includes one or more work station terminals intercoupled via a local area network.

Figure 2:
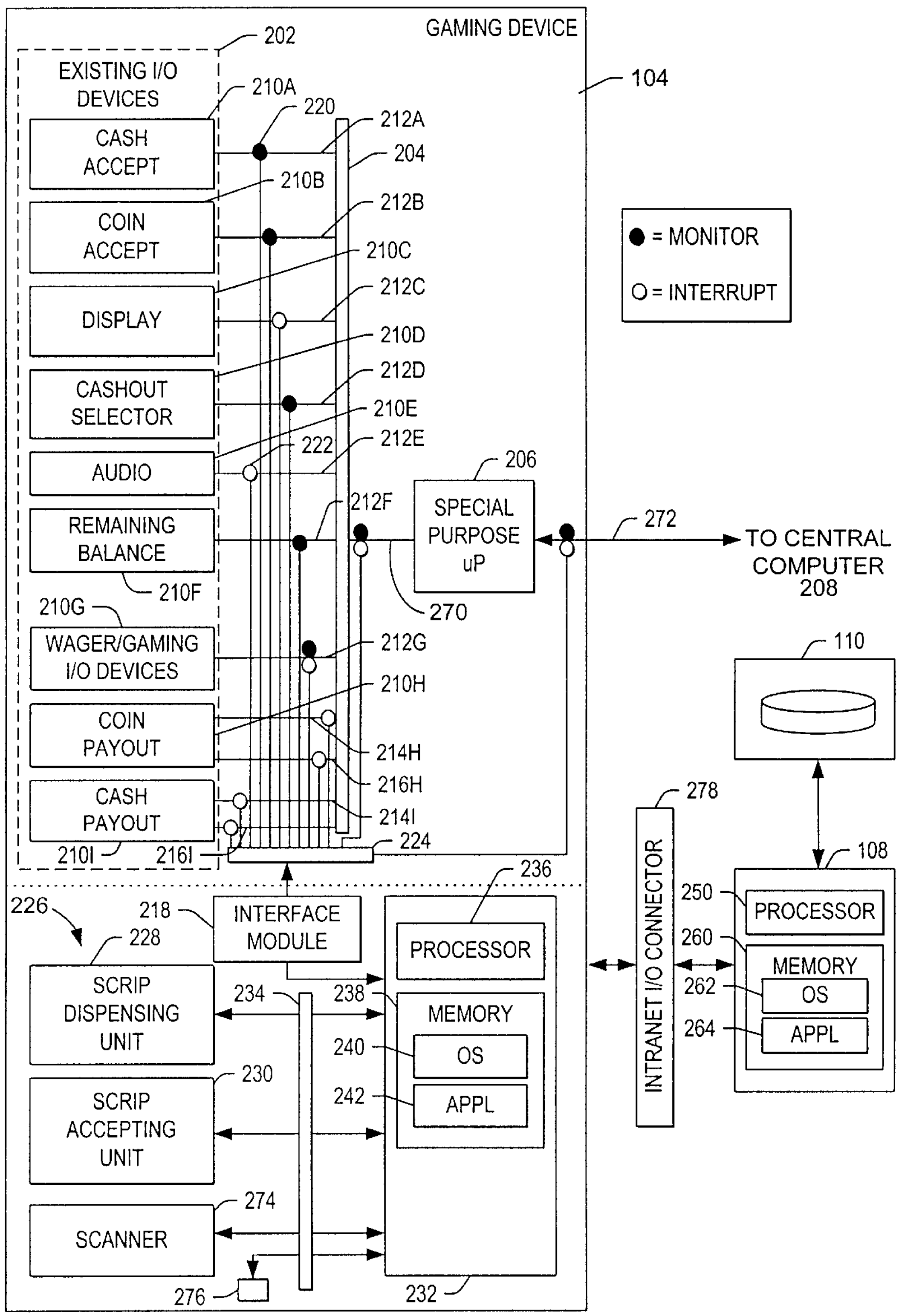
FIG. 2 is a diagram illustrating an exemplary embodiment of a modified gaming device.

FIG. 2 is a diagram presenting an illustrative embodiment of a gaming device 104. Typically, gaming devices 104 comprise a number of existing legacy I/O devices 202, each coupled to one or more legacy microprocessors 206 via I/O bus 204 and existing legacy communication paths 212A–212I (collectively referred to as communication paths 212). Communications between existing I/O devices 202 and the microprocessor 206 can be either serial or parallel. Typically, the microprocessor 206 is a special purpose device designed or programmed for the gaming device 104. Microprocessor 206 accepts user inputs from the existing I/O devices 202 via communication path 270, processes these inputs, and provides outputs to the I/O devices such as the display 212 via communication path 270. Microprocessor 206 is also typically coupled to a central computer 208 via a low speed serial connection 272, and can collect data from the gaming device 104 via the microprocessor. Microprocessor 206 to central computer 208 communications are typically one way (from the microprocessor 206 to the central computer 208).

Existing I/O devices 202 comprise cash acceptor 210A. This device accepts cash from the user, verifies that the cash is genuine, and relays the denomination accepted to the microprocessor 206 via a cash accept signal on the cash accept communication path 212A. Cash acceptor 210A may comprise a device similar to a currency reader, which can verify the appearance of the printed currency as well as the feel of the paper.

Existing I/O devices 202 also includes a coin acceptor 210B, which accepts coin from the user, verifies that the coin is genuine, and relays the amount and value of the coin accepted to the microprocessor 206 via a coin accept signal on the coin accept communication path 212B. The coin acceptor may be similar to those employed in vending machines in which the size and weight of the deposited coinage is measured. Although the cash acceptor 210A and the coin acceptor 210B are depicted as separate devices, the functionality provided by these devices may be provided by a single integrated device.

Existing I/O devices 202 also comprise a display 210C. Increasingly, display 210C comprises a video display presenting virtually all information conveyed to the user. For example, if the gaming device is a slot machine, the display 210C may show the "reels" to the user, as well as the wager, the amount paid, the amount remaining in the cashout account, and a variety of other information. Further, display 210C can also be used to accept input to the gaming device 104 by a touch screen or similar pointing device (such as those employed in connection with graphical user interfaces in home computer applications) and to forward the input to the microprocessor 206. The display 210C communicates with the microprocessor 206 using a display signal via a display communication path 212C.

Cashout selector 210D is usually a simple switch that the user can depress when they are finished using the gaming device 104 and want the machine 104 to pay out the cashout balance $K_{CO}$ (i.e. the amount remaining in the cashout account). For example, if the user deposited coin or currency through the cash/coin-accepting devices 210A and 210B in the amount of twenty dollars, the cashout balance begins at twenty dollars, and is increased or decreased thereafter according to the results of the game played. The cashout selector 210 provides a cashout command or signal to the microprocessor 206 via the cashout communications link 212D.

Audio device 210E accepts an audio signal on the audio communications link 212E from the microprocessor 206. Typically, the audio device 210E is a simple loudspeaker.

However, the audio device 210E may also include a microphone or a special purpose processor coupled to a piezoelectric transducer. If desired, a video device can also be utilized to view the area round the gaming device. This can be used to prevent theft or to verify authorized payouts.

Remaining balance indicator 212F shows the user the cashout balance according to the cashout balance signal provided on the cashout balance communications link 212F. This I/O device could be an LED display or similar device. The function of this device may alternatively be performed by the display 210F itself.

Wager/gaming I/O devices (WGDs) 210G include a number of user controls that allow the user to play the gaming device. In the case of a draw poker gaming device 104, the WGDs 210G may include buttons selecting the cards to draw or hold, a button for selecting a new game, a button for determining the wager for each hand played, or other buttons. Similar buttons would be employed with a blackjack gaming device or a slot machine.

Coin payout device 210H pays coin or tokens to the user based upon their winnings in accordance with a coin payout quantity signal on the coin payout quantity communication path 216H. In most circumstances, the present invention minimizes the use of this device because payouts may be provided at least in part in the form of scrip, instead of coin.

The coin payout device 210H can be activated and deactivated according to a coin payout enable signal provided on a coin payout enable communication path 214H. This prevents inadvertent dispensing of coin or cash by disabling the coin payout device 210H until it is time for the payout to occur. In many gaming devices, the power wire to the coin payout device 210 can be used for a coin payout device enable communication path 214H. In such cases, the coin/cash payout device can be activated and deactivated simply by applying or removing power to the power wire. This can be accomplished with a suitable relay or semiconductor switch, preferably under control of the dispensing device computer 232.

Similarly, the cash payout device 2101 pays cash to the user based upon their winnings in accordance with a cash payout quantity signal on a cash payout quantity communication path 216I. The cash payout device 210I can be activated and deactivated according to a cash payout enable signal provided on a cash payout enable communication path 214I.

A scrip dispensing device 226 is communicatively coupled to the gaming device 104. The scrip dispensing device 226 comprises a scrip dispensing unit 228 and a scrip-accepting unit 230. The scrip dispensing unit 228 and the scrip-accepting unit 230 can be distinct devices or both scrip dispensing and scrip accepting functions may be performed by a single scrip accepting/dispensing device.

The scrip-dispensing unit 228 dispenses scrip in accordance with commands from the scrip dispensing device computing device or local computer 232. Similarly, the scrip-accepting unit 230 accepts scrip dispensed from any one of the gaming devices 104 in the gaming system 100. The scrip-dispensing unit 228 and the scrip-accepting unit 230 are operatively coupled to the local computer 232 via bus 234, which may be either parallel or serial, or a combination of both.

The scrip dispensing unit device computer 232 can be advantageously selected as an off the shelf processor assembly, comprising a processor 236, memory 238 tangibly embodying instructions which comprise an operating system 240 and one or more applications 242. Further, the operating system 240 and the applications 242 are comprised of instructions which, when read and executed by the computer processor 236, causes the scrip dispensing unit device computer 232 to perform the steps necessary to implement and/or use the present invention. Application 242 and/or operating system 240 instructions may also be tangibly embodied in memory 238 and/or data communications devices, thereby making a computer program product or article of manufacture according to the invention. As such, the terms "article of manufacture" and "computer program product" as used herein are intended to encompass a computer program accessible from any computer readable device or media.

In one embodiment, the operating system of the scrip dispensing unit device computer is the popular LINUX, WINDOWS, WINDOWS 95/98, WINDOWS NT, or WINDOWS CE operating system. Since the computational requirements of the scrip unit device computer 232 are reasonably simple, the operating system and associated hardware can be similar to or compliant with hand-held computing systems using the WINDOWS CE operating system. Processor 236 may also advantageously comprise a reduced instruction set computer (RISC) processor. This embodiment has the particular advantage of increasing the functionality provided by the scrip dispensing device 226, since data and functional selection can be performed using standard off-the-shelf intranet or other networking hardware and software.

The scrip dispensing device computer 236 is also operatively coupled to a scanner 274. The scanner 274 reads which reads codes on the pre-coded scrip according to a command from the local computer 232, and provides the codes as data to the local computer 232.

In one embodiment, the scrip dispensing device computer 236 is also operatively coupled to an infrared signal transmitter/receiver 276. The transmitter/receiver 276 allows wireless, infrared transmissions between external devices such as a personal data assistant (PDA) or a laptop computer and the scrip dispensing device computer 236. IN one embodiment, this is implemented with an IrDA port having an IrDA serial IR physical layer. An Infrared Link Access Protocol (IrLAP) is used for a data link protocol, and an Infrared Link Management Protocol (IrLMP) is used to implement handshaking and multiplexing of multiple data streams.

The scrip dispensing device computer 236 is operatively coupled to an Intranet server 108 via Intranet connector 244 communications link 106. The Intranet server 108 comprises an Intranet server processor 250 and memory 260 storing instructions for the operating system 262 and any applications. Intranet computer 108 may also be operatively coupled to a data manager 110, and may be operatively coupled to the central computer 208 as well. Alternatively, some or all of the storage and functions provided by the data manager 110 may be implemented in the Intranet server 108. The Intranet server 108 may also be coupled to the central computer 208 to implement legacy functions.

In one embodiment of the present invention, the scrip dispensing device computer 232 obtains the information required to dispense, manage, and accept scrip by essentially tapping into the communication links 212 between the existing I/O devices and the microprocessor 206. With these connections, the scrip dispensing device 226 can determine when cash or coin is accepted by the gaming device 104, the amount of cash or coin accepted, when cashout is selected by the user, the balance of the cashout account, wager and other gaming inputs, and the amount paid out to the user. This information is useful in performing the scrip distribution, and acceptance functions, but is useful also in providing statistical and other information to the owner of the gaming system 100 regarding gaming device 104 usage and other information. This embodiment allows the scrip-dispensing device 226 to be incorporated with a wide variety of gaming devices 104 with minor modification by patching into the existing I/O devices 202.

Information from the existing I/O devices 202 is provided to the dispensing device computer 232 via an interface module 218 and gaming device I/O bus 224.

In one embodiment, the gaming device I/O bus 224 is a low level interface bus, and the interface module is communicatively coupled to requisite existing I/O devices 210A–210I in the following ways.

First, the interface module 218 (through a low level interface bus 224) may be coupled to any of the communications links 212 via a signal monitoring device 220. This device monitors the signal being passed in the communication link 212, but does not interrupt or otherwise alter the signal content. In one embodiment, the signal monitoring device 220 is a small coil, placed around the communication link 212 to detect current flowing through the communication link 212. This allows the scrip dispensing device computer 232 to monitor the signal, but does not allow the scrip dispensing device computer 232 to alter the signal.

Second, the interface module 218 may be coupled to any of the communication links 212 via a signal interrupting and/or substitution device 222. This device, which operates under the control of the local computer 232 and/or the interface module 218, breaks the communication link 212 between its associated existing I/O device 202 and the microprocessor 206, and provides the signal on the communications link 212 to the local computer 232. This allows the local computer 232 to modify the signal before providing it to its ultimate destination, or to substitute an entirely new signal. Of course, the local computer 232 can also provide the original signal to the existing I/O device 202 as well.

For example, suppose an important announcement must be made in the casino. Typically, the microprocessor 206 in each of the gaming device 104 is providing an audio signal to the audio device 210E, for purposes of game play. Taken together, the audio output of a number of gaming devices 104 can be loud enough to prevent the announcement from being heard. Instead of increasing the volume of the public address system to overcome the din of all of the gaming machines, the present invention allows the audio signal normally provided to from the microprocessor 206 to the audio device (game play audio) to be interrupted and/or diverted to the local computer 232. This allows the silencing the audio device 210. Further, using a suitable signal from the intranet computer 108 to the local computer 232 of selected gaming devices, this technique can be used to silence the audio signal at any particular gaming device 104, a bank of gaming devices 102, or all of the gaming devices in the gaming system 100.

The local computer 232 may provide a substitute signal to the audio device 210E instead of the game play audio. This substitute signal can be a processed *.wav file or other computer file containing audio information. The substitute signal can be stored in the scrip dispensing device computer 232 memory 238, or obtained from the Intranet server 108 via Intranet connectivity 278. In one embodiment of the present invention, the audio signal is interrupted and routed to the scrip dispensing device computer, where it is reduced in intensity, and mixed with audio data (such as a verbal announcement) from the intranet server 108. In this way, game play audio can continue, but at an abated level, so that the announcement may be heard. This feature can also be used to provide other aural information to the user. For example, if a particular bank 102 of gaming devices 104 has entered a bonus play situation, this fact can be announced with the audio device 210E or the display 210C.

The foregoing ability to monitor and/or interrupt the signals from the existing I/O devices 202 to the microprocessor 206 also allows the operation of the scrip dispensing unit 228 with the coin payout device 210H. The interface module 218 monitors the cashout signal on the cashout communications link 212D, and provides the monitored signal to the scrip dispensing device computer 232. When the user decides to cashout, the cashout selector 210D is selected, and a signal is sent to the microprocessor 206. Ordinarily, the microprocessor 206 would activate the coin payout device 210H with the coin payout enable signal to activate the coin payout device 210, and provide a coin payout quantity signal to indicate the number of coins to be dispensed (typically, the cashout balance). The coin payout device 210 would then dispense the required number of coins. The present invention interrupts the coin payout enable communications link 214H to prevent coins from being dispersed, computes the value or number of scrip and the number of coin to be dispensed, and provides a substitute payout quantity signal to the coin payout device 210H.

The ability to monitor or interrupt the signals from the existing I/O devices 202 to the microprocessor 206 also allows the capabilities of the gaming device 104 to be greatly expanded or altered. Signals from the coin accept device 210A can be monitored to keep track of how many coins have been entered into the gaming machine 104. This number can be reported directly to the Intranet computer 108, or accumulated in the local computer memory 238, and reported to the Intranet computer 108 when requested, or when the number of accumulated coins is above or below a particular amount. Information from the coin accept device 210B or the cash accept device 210A can be used to determine whether the machine is frequently used, indicating that it is either a popular machine type, or placed in a popular location. Statistics correlating the machine type with the location can be used to determine the best location gaming devices 104. Statistics can also be used to determine which gaming devices have faulty coin/cash accept or coin/cash payout devices.

In one embodiment of the present invention, the I/O bus communication path 270 between the I/O bus 204 and the microprocessor 206 and the serial communications path 272 to the central computer 208 can be monitored or interrupted. This embodiment permits the function of the special purpose microprocessor to be monitored, altered, or bypassed entirely. Also, the scrip dispensing device computer 232 could interface directly with the microprocessor 206, or the functions performed by the scrip dispensing device computer 232 could be performed by the microprocessor 206 itself. Further, the scrip-dispensing device 226 can be housed in the gaming device 104, or may be physically separated from the gaming device 104, so long as the communication provided by the gaming device I/O bus 224 is provided.

Many current gaming machines operate by exchanging currency for a number of credits in a payout account. The player may then choose to have winnings credited to the payout account, and losses debited from that account. This reduces unnecessary coin flow through the gaming machine.

The present invention can be practiced in several embodiments. In a first embodiment, when the user elects to cashout, the user is given a single unit is scrip with a value equal to the entire cashout value. In this embodiment, the bar code on the next scrip unit in the scrip dispensing unit is scanned and transmitted to the intranet server 108. The Intranet server 108 stores the bar code information and associates the stored bar code information with a cashout value. When the user inserts the dispensed scrip into another machine, the bar code is scanned, and transmitted to the Intranet server 108. The cashout value associated with the bar code is determined, and transmitted to the scrip dispensing device computer 232. The scrip dispensing device computer 232 determines the number of credits to be awarded, and, using the interface module 218, provides one or more coin accept signals on the coin accept communication path 212B as required to provide the required number of credits.

In a second embodiment, when the user elects to cashout, the player is provided with a combination of scrip (which may be one or more individual scrip units) and one or more coins/tokens. In this embodiment, when a cashout signal is detected, the coin payout device 210H is deactivated by interrupting the coin payout enable signal and the coin payout quantity signal. A computation is performed to determine how much of the cashout value will be dispersed in scrip and how much will be dispersed in coin. After this determination is made, the appropriate number of coins are dispensed by providing a substituted coin payout quantity signal, and a coin payout enable signal to the coin payout device 210H. The appropriate value of scrip is then dispensed by dispensing one or more scrip cards. The bar code of each scrip card is scanned, and the information obtained therefrom is then provided to the Intranet server 108 before the scrip is dispensed. Each unit of scrip may have a pre-assigned value (in which case more than one scrip unit may be required, but the value of the scrip to be dispensed need not be stored in the database), or may be assigned in accordance with the cashout balance.

Figure 3:
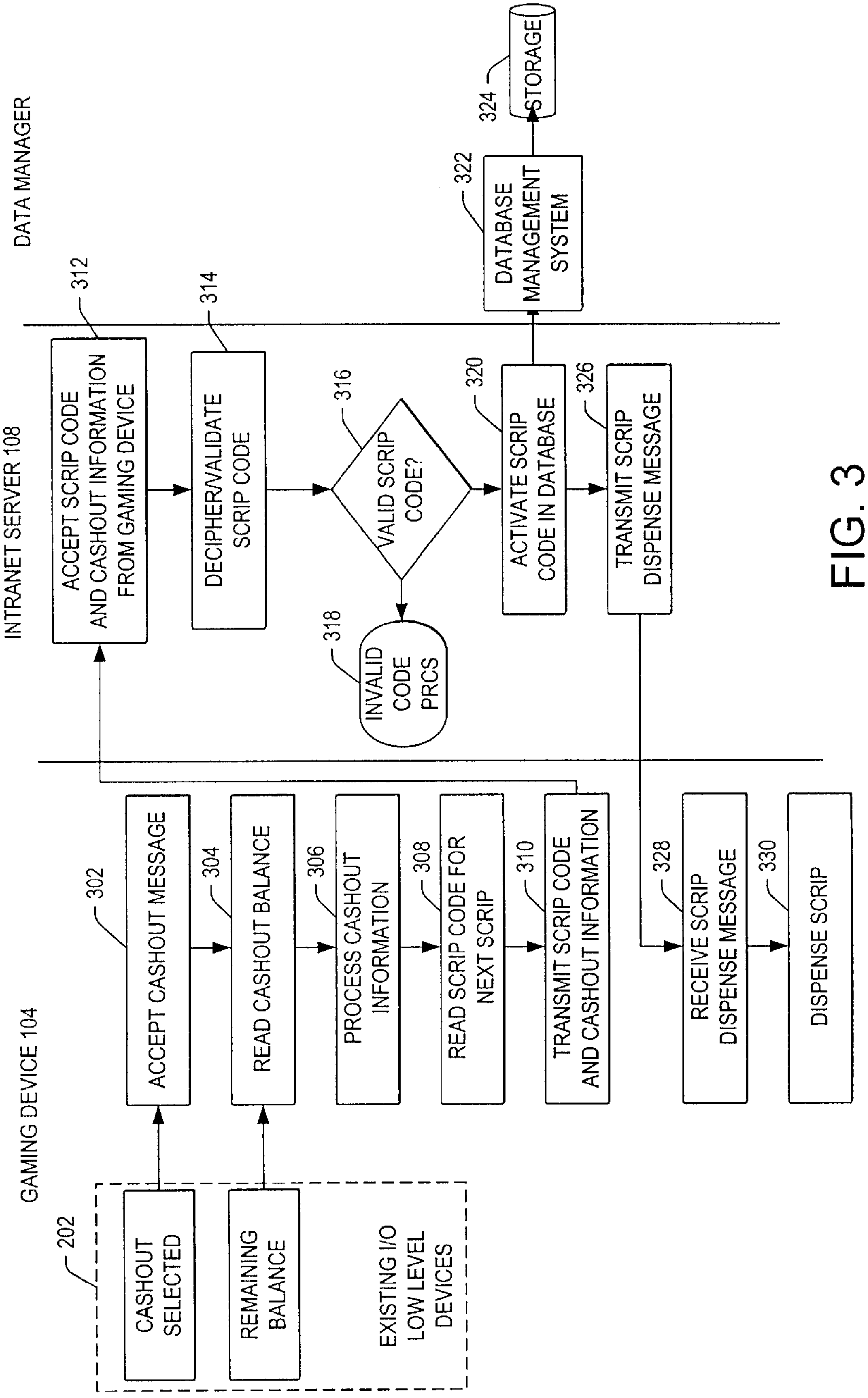
FIG. 3 is a diagram showing an illustrative embodiment of the operations performed in obtaining scrip from the gaming device.

FIG. 3 is a flow diagram illustrating the first embodiment described above. When the player has completed playing the machine, and decides to cashout the credits in the payout account, the user activates cashout I/O device 210D. The through the interface module 218 and the signal interrupting and/or substitution device 222, the local computer 232 monitors and accepts 302 the cashout message. The local computer 232 then reads 304 the cashout balance from the remaining balance I/O device 210F, and processes 306 the cashout information. The cashout information includes the cashout balance, but may also include other information about the user's gaming patters or history, gaming device 104, diagnostic, security, or other information.

After the user selects the cashout I/O device 210D, the scrip dispensing unit 228 reads 308 scans a scrip unit or scrip card to read a pre-coded scrip code. The code uniquely identifies each scrip unit. The scrip dispensing device computer 236 transmits the scrip code (and any other information) to the Intranet server 108 or other remote computer.

Scrip dispensing unit 228 holds a plurality of scrip cards, each of which has a pre-coded scrip code. Typically, the scrip code is a simple bar code representing a variable with multiple characters. In one embodiment, the scrip code is a 20 character variable. The first three characters designate casino, the next 11 alphanumeric characters are a unique scrip card code designating the scrip card number. The next three characters are security characters used to decode the scrip card code to assure that it is genuine. This is accomplished by establishing a predictable relationship between the scrip card code and the three-digit number. Algorithms suitable for testing this predictable relationship are securely stored in the Intranet server 108 or the data manager 110, and read when necessary to validate the scrip card code. For example, assume that the scrip card code is the eleven digit number "91234567890." An algorithm can be defined wherein the security characters are the result of the following relationship:

$$SecurityCode = \left[ frc\left( \pi + \left( \frac{91234567890}{99999999999} \right) \right)^{5} \right] \quad (1)$$

Without knowledge of the foregoing equation, the relationship between the security code and the scrip card code will appear to be an unpredictable random number. However, when the Intranet server 108 performs the foregoing computation, the security code on the scrip card can be verified. Other private key encryption techniques are also possible. Further, it may be advantageous to change the seed value (represented by the character π in the above equation) at regularly scheduled intervals, either randomly, or according to a predefined relationship. The last three characters in the scrip code are used to perform checksum operations to reduce errors.

Next, the Intranet server 108 accepts the message with the scrip code and cashout information. The scrip code is then deciphered and validated 314. This can be accomplished with private or public key information stored in the Intranet server 108, or the data manager 110. If the deciphering indicates that the scrip code is a valid code, the scrip code is activated. This is shown in blocks 316 and 320. The scrip code may be activated by storing a flag associated with the code stored in the data manager 110, or can be accomplished by storing the code itself in the data manager. After the scrip code is activated, a scrip dispense message is sent 326 to the gaming device 104. The gaming device 104 receives 328 this message, and dispenses 330 the scrip card.

Many gaming machines give the player the option of issuing all winnings in coin, an option that can rapidly exhaust the coin cache in the gaming machine. To obviate this problem, provision may be made in the foregoing for logic to prevent coin payouts below or above a certain amount. Provision may also be made to issue payouts in a combination of scrip cards and coin.

Given the foregoing teaching, it is apparent that the scrip code read from the scrip card may be read with an optical or other type of reader as the scrip card is expelled from the scrip dispensing unit 228. However, the foregoing process of reading the scrip card, verifying the code and activating the code before disbursal to the user is preferred because it prevents the user from interfering with the reader by prematurely pulling the scrip card, and it prevents passing anything to the user until after it is assured that the issued scrip card is valid. For example, it is preferable to discover a printing error or other defect in the pre-printed scrip card before disbursal.

Figure 4:
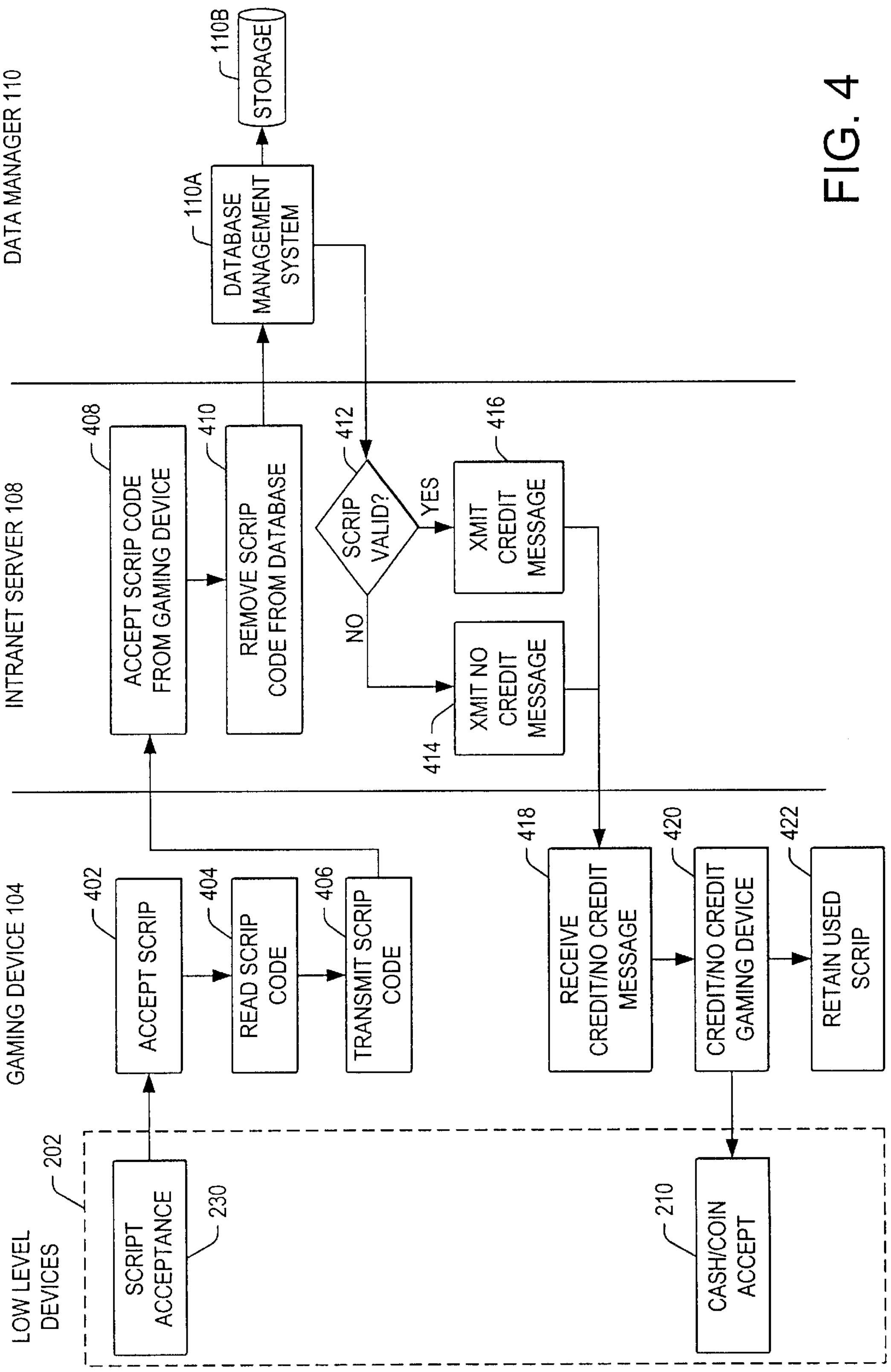
FIG. 4 is a diagram showing an illustrative embodiment of the operations performed in using scrip issued from a gaming device.

FIG. 4 is a flow diagram showing exemplary operations performed in using scrip cards issued from the gaming device as described in FIG. 3. First, the user inserts the dispensed scrip into the scrip-accepting unit 230. A scrip code reader inside the scrip accepting unit 230 accepts 402 and reads 404 the scrip card code, and transmits the scrip code 406 to the intranet server 108. The intranet server 108 receives 408 the scrip code message (as well as any other information that is passed along by the gaming device 104)

and verifies that the scrip code is valid by deciphering the scrip card code with the security characters as described above in reference to FIG. 3. If the card is valid, the value or credits associated with the scrip code is read, and the scrip code is removed 410 from the database, or a flag or other data is written to the database to indicate that the scrip card with the received code is no longer active. If the scrip units do not have a predetermined value, a message indicating the value of the scrip card is also sent from the Intranet server 108 to the gaming device 104. If the scrip is not valid 412, a no credit message is sent to the gaming device 104. Otherwise, a credit message is received 418 by the gaming device 104 and the user is credited 420 the appropriate amount. In one embodiment, this is accomplished via appropriate the cash/coin acceptance device 210 (which will be detected at the processor 206 as if they were received directly from the device). The (now) used scrip card is then retained in the gaming device 104. These used scrip cards can then be used by the hosting casino to keep track of gaming device 104 receipts. Scrip accepting unit 230 may be a special purpose device dedicated to reading the scrip card codes, or may be a modified cash/coin acceptance I/O device. In an embodiment using optical bar codes for the scrip card code, this can be accomplished by integrating a simple optical reader in a cash/coin acceptance device.

Figure 5:
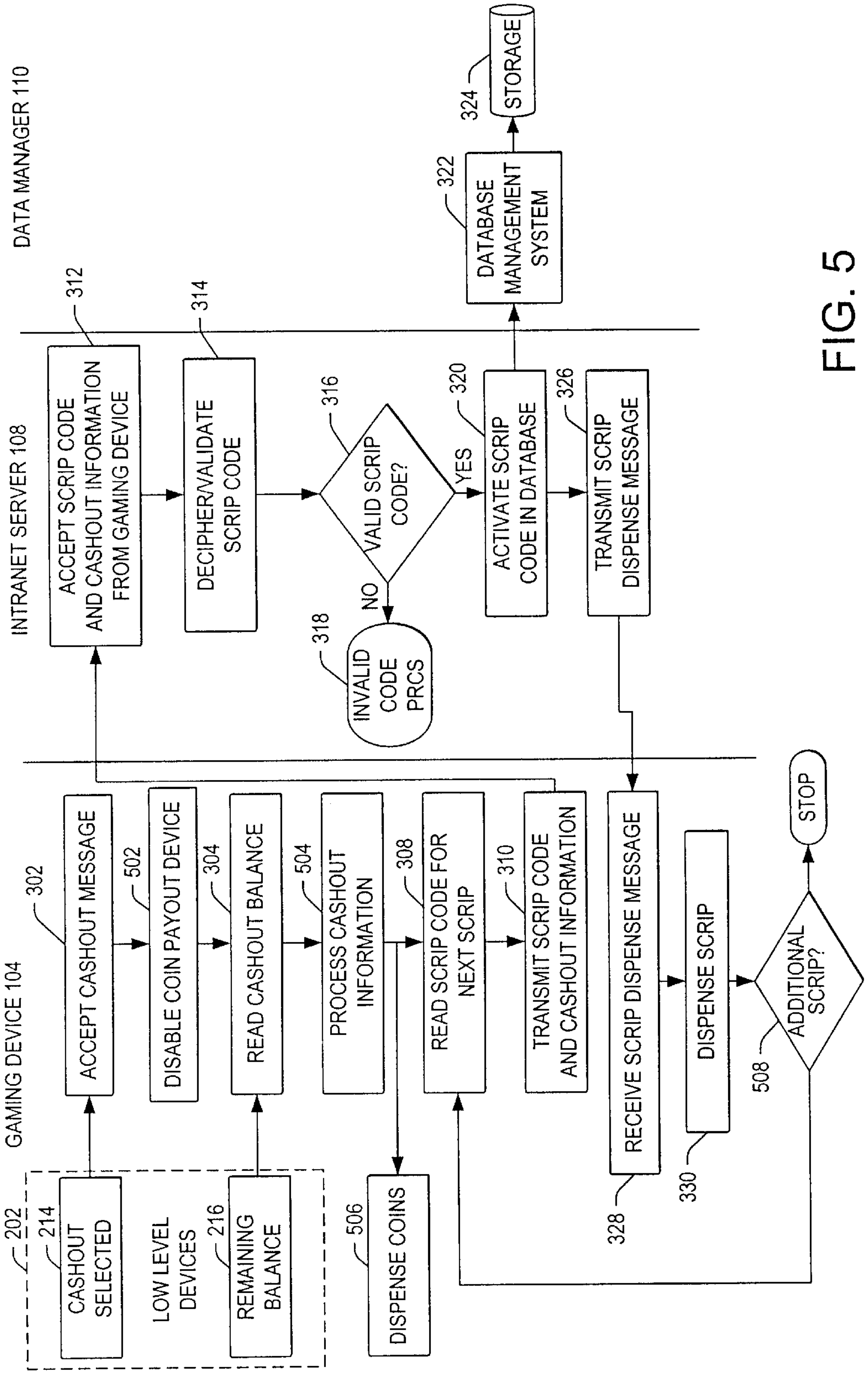
FIG. 5 is a diagram showing a second illustrative embodiment of the operations performed in obtaining scrip issued from a gaming device.

FIG. 5 is a flow chart illustrating the second embodiment described above, in which upon cashout selection, the player is provided with a combination of scrip and one or more coins/tokens. When the player has completed playing the machine, and decides to cashout the credits in the account, the user activates cashout I/O device 210D. Through the interface module 218 and the signal interrupting and/or substitution device 222, the scrip dispensing unit device computer 232 monitors and accepts 302 the cashout message. Next, the coin payout device 210H is disabled by interrupting the coin payout enable communication path 214H. This is depicted in block 502. Optionally, the coin payout quantity signal, which describes the number of coins to be dispensed, can also be interrupted. The scrip dispensing unit device computer 232 then reads 304 the cashout value $K_{CO}$ from the remaining balance I/O device 210F, and processes 306 the cashout information to compute the number of scrip units to be dispensed by the scrip dispensing unit 228 and the number of coins to be dispensed by the coin payout device 210H.

Where scrip units have a predetermined scrip value $K_S$, multiple scrip units and multiple coins/tokens may be dispensed. In this situation, the number of scrip units m to be dispensed is computed according to the following relationship $$K_{CO}=mK_S+K_{rem} \quad (2)$$

wherein m is the largest positive integer satisfying the above relationship, $K_s$ is a positive number representing the scrip value, and $K_{rem}$ is a positive number representing the remainder of the cashout value. The remainder cashout value $K_{rem}$ is then used to determine an equivalent number of coins/tokens to be dispensed. A signal or message indicative of this number is supplied to the coin payout device 210H as a substituted coin payout quantity signal on the coin payout quantity communication path 216H. In one embodiment of the present invention the payout quantity signal is a series of pulses indicating the number of coins to be dispensed. The coin payout enable signal (which was interrupted or disabled in operation 502 above) is then provided to activate the coin payout device 210H. At this time, the coin payout device 210H begins dispensing coins having a cumulative value of $K_{rem}$.

Before, during or after the foregoing operations, the scrip dispensing unit 228 scans 308 a scrip unit or scrip card to read a pre-coded scrip code. The scrip code uniquely identifies each scrip card. The scrip dispensing device computer 236 transmits the scrip code (and any other information) to the Intranet server 108 or other remote computer.

Next, the Intranet server 108 accepts the message with the scrip code and cashout information including the cashout value. The scrip code is then deciphered and validated 314. If the deciphering indicates that the scrip code is a valid code, the scrip code is activated by sending an appropriate message to the data management system 322 for storage 324. This is shown in blocks 316 and 320. The scrip code may be activated by storing a flag associated with the code stored in the data manager 110, or can be accomplished by storing the code itself in the data manager. After the scrip code is activated, a scrip dispense message is sent 326 to the gaming device 104. The gaming device 104 receives 328 this message, and dispenses 330 the scrip card.

As described above, in this embodiment of the invention, the scrip value $K_S$ and the cashout value $K_{CO}$ may require more than one scrip unit (m>1) to be dispensed Block 508 determines whether additional scrip cards must be dispensed. If so, the scrip dispensing unit 228 reads the scrip code for the next scrip card, and the foregoing steps are performed again. This process is repeated until all of the required scrip units have been dispensed. In one embodiment, this can be accomplished by determining a decremented the cashout value $K_{CO}'$ as $K_{CO}-K_S$ each time a scrip card is dispensed, and repeatedly dispensing scrip and decrementing the cashout value until $K_{CO}' \geqq K_S$.

In the embodiment described above, a cashout balance signal 212F was available from the remaining balance I/O device 210F. In some cases, the remaining balance is indicated by plurality of light emitting diode (LED) elements driven by either separate wires, or by a simple parallel interface. In such cases, the cashout balance can be determined merely by monitoring which LED segments are activated, or by reading signals on the parallel interface. However, increasingly, the cashout balance and many other game play parameters are displayed to the user on a cathode ray tube (CRT) display. Although it is theoretically possible to retrieve the cashout balance from the CRT, it would generally be prohibitively expensive to do so. Consequently, an alternative embodiment of the present invention also utilizes a unique method for determining the cashout balance.

As described above, some payout devices 210H and 210I operate with a payout enable signal provided on a payout enable communication path 214H and 214I, and a payout quantity signal provided on a payout quantity signal path 216H and 216I, respectively. The payout enable communication path may be a line connecting a 100V power source to the payout device, a line connecting a 20V power source or a logical signal.

In some cases, the payout quantity signal is an analog or a digital signal provided by the microprocessor 206 whose characteristics describe the number of units to be paid out. Digital signals can comprise a series of pulses, one for unit to be dispensed, or other signal. In such cases, after the user elects to cashout, the payout enable signal is interrupted, and the cashout value is simply read off of the appropriate payout quantity communication links 216H and 216I.

In other cases, the payout device dispenses coins under direct control of a device controller such as the microprocessor 206. When the user elects to cashout, the microprocessor 206 enables the coin payout device 210H, which begins dispensing coins. Each time a coin is dispensed, the coin payout device transmits a coin payout quantity signal (in this case, a pulse) to the microprocessor 206 over the coin payout quantity communication path 216H. This is ordinarily accomplished via a microswitch in the coin payout device 210H. The microprocessor 206, which has access to the cashout balance, simple decrements the cashout balance by one coin each time a coin is dispensed by the coin payout device 210H. When the cashout balance has been decremented to zero, the microprocessor 206 disables the coin payout device 210H by suitably changing the payout enable signal 214H.

To accommodate this sort of design, one embodiment of the present invention operates as follows. The cashout communications link 212D is monitored. When a cashout signal is detected, the enable signal between the microprocessor 206 and the payout device 210 is interrupted. The payout quantity signal on the payout quantity communications path 214H is also interrupted. In its place, the local computer 232 provides a substitute payout quantity signal (another series of pulses) and monitors the enable signal from the microprocessor 206. The processor continues to provide this payout quantity signal until the state of the enable signal changes. Each time that a payout quantity signal pulse is provided to the microprocessor 206, a counter in the local computer 232 is incremented. When the state of the enable signal changes, the counter in the local computer indicates the cashout value (number of credits). Then, this number is used to determine the number of coins and the number of scrip cards to be dispensed to the user. This can be accomplished using the mathematical relationships described above. Alternatively, this can be accomplished by providing a substituted payout quantity signal to the microprocessor 206. A check is made to determine if the number of payout quantity signals provided is $mK_s$ wherein m is a positive integer. If this is the case, then a dispense signal is provided to the scrip dispensing unit 228 to dispense a scrip card. Then, the number of substituted payout quantity signals is incremented, and the foregoing operations repeated until the monitored enable signal from the first device controller is disabled. This indicates that a sufficient number of payout quantity signal has been provided to account for the cashout balance. Next, the interrupted enable signal is provided to the coin payout device 210H, and the coin payout quantity communication path 216H is monitored. When the number of pulses describes a number equivalent to the difference between incremented number of substituted payout quality pulses that were provided to the microprocessor and $mK_s$, a sufficient number of coins have been dispensed, and the enable signal is removed so that no more coins are dispensed.

Figure 6:
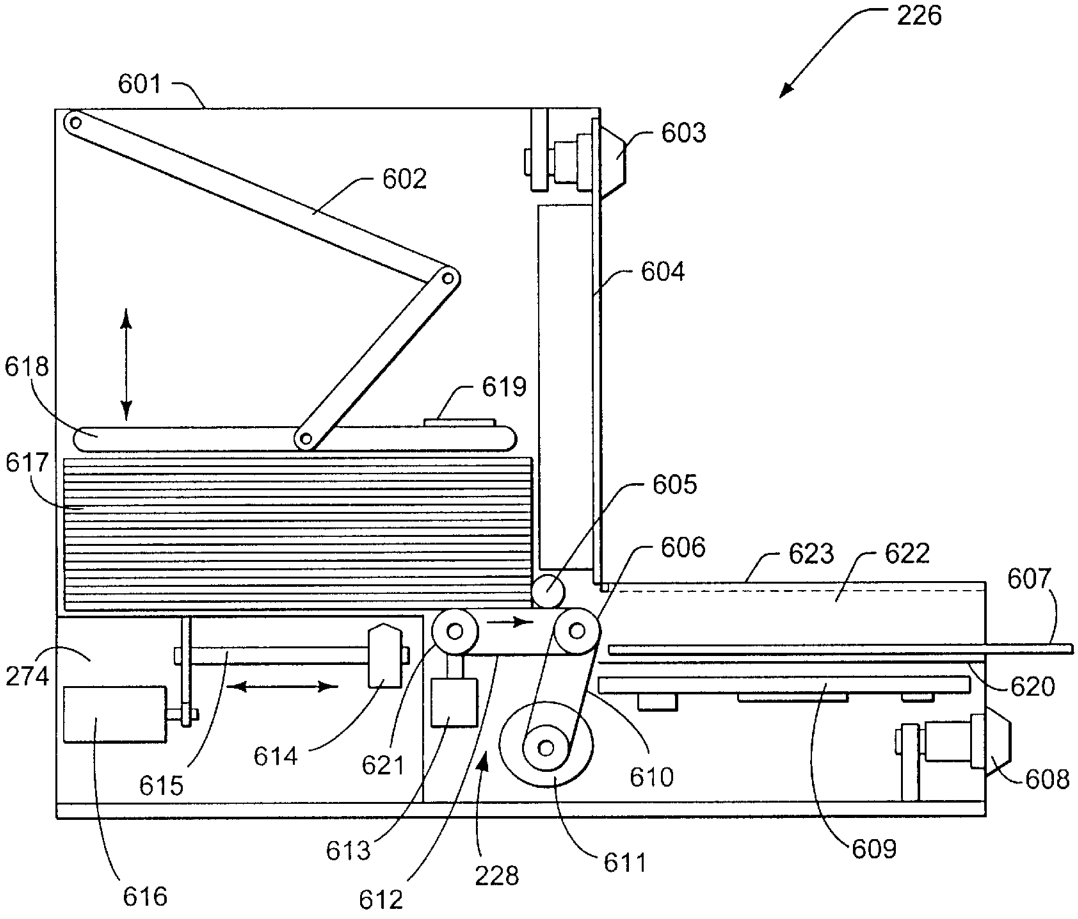
FIG. 6 is a diagram showing a schematic view of exemplary embodiment of the scrip-dispensing device.

FIG. 6 presents a side view of an one embodiment of the scrip-dispensing device 226. The scrip-dispensing device 226 comprises a housing 601, which surrounds and protects the device 226. A front door 604 is provided for loading scrip cards in the scrip-dispensing device 226, and a front door lock 603 prevents access by unauthorized personnel. Securing lock 608 secures the scrip-dispensing device 226 to a mounting surface.

To reduce complexity of the feeding mechanism and to minimize space requirements (the scrip-dispensing device 226 is nominally 12" by 9" by 4"), the pre-printed scrip cards 617 are dispensed using gravity. The interior of the scrip-dispensing device 226 can accommodate in the order of one thousand pre-coded scrip cards. To assure sufficient downward force to dispense the coupons, a telescoping or articulating arm 602 coupled to a weight 618 is provided. Weight 618 assures a minimum downward force is applied to the scrip cards 617, even when only a single scrip card remains to be dispensed. Weight 618 includes an adjusting device 519 such as a strip magnet to balance the force urging the scrip cards 617 in a downward direction. When additional scrip cards are added to the scrip-dispensing device 226, the lock 603 is unlocked, the front door 604 is opened, and the door is swung out or removed. Weight 618 is moved to the top of the housing 601, and retained there by the adjusting device 619. In one embodiment, this is accomplished by the use of a ferro-conductive element on the inner surface of the housing 601 and with a strip magnet for the adjusting device 619. After inserting the new scrip cards 617 (with the barcode to be read facing down), the front door 604 is closed and locked 603. In the event that the person adding the new scrip cards 617 neglected to pull the weight 518 down, a wedge or other device operatively coupled to the front door separates the weight from the upper inner surface of the housing.

In one embodiment, the local computer 232 is implemented in a logic PC board 609. When the logic PC board 609 receives a command to dispense a scrip card, the scanner 624 reads the code on the bottom side of the bottom scrip card 760. To accomplish this, drive motor 616 uses translation shaft 615 (such as a screw-threaded shaft) to move optical barcode reader sensor 614 across the scrip barcode to read the scrip code. Information from this process is sent to the logic PC board 609, and eventually forwarded to the Intranet computer 108. As described above, if a valid code is read, the scrip dispensing unit 228 then proceeds to dispense the bottom scrip card 760. This is accomplished by activating solenoid 612 and drive motor 611. Solenoid 612 pushes upward on the idler pulley 621, causing the transport belt 612 to make contact with the bottom scrip card 760. Motor 611 provides motive torque to the drive pulley 606 via the drive belt 610. This moves the transport belt 512 in the indicated direction, dispensing the bottom scrip card 760 through channel 622.

In one embodiment, this operation involves translational motion on the part of idler pulley 621, and only rotational motion of the drive pulley 606. In other words, the transport belt 612, idler pulley 613 and drive pulley 606, rotate as a unit clockwise about the drive pulley's longitudinal axis upon activation of the solenoid 613. Once the bottom scrip card 760 has moved sufficiently towards the drive pulley 606, contact between the bottom scrip card 760 and the transport belt 612 near the idler pulley 623 is no longer required, and the solenoid 613 is deactivated. Thereafter, the scrip card is dispensed via contact between the bottom scrip card 760 and the transport belt 612 near the drive pulley 606. If necessary, one or more pinch rollers can be provided near the drive pulley 506 to grip the bottom scrip card 760.

To prevent more than one scrip card from being dispensed at a time, an anti-stripping wheel 605 is provided. The anti-stripping wheel 605 rotates counter clockwise (and therefore counter to the rotation of the transport belt 612), thereby preventing the dispensing of multiple scrip cards.

Dispensed scrip card 607 passes through channel 622 formed between lower shelf 620 and upper shelf 623. The channel and shelf structures prevent damage to the electromechanical elements of the scrip-dispensing unit 228. This is important, since the scrip dispensing device 226 (particularly when installed externally from the gaming device 104) is subject to spilled liquids and other foreign matter.

Figure 7:
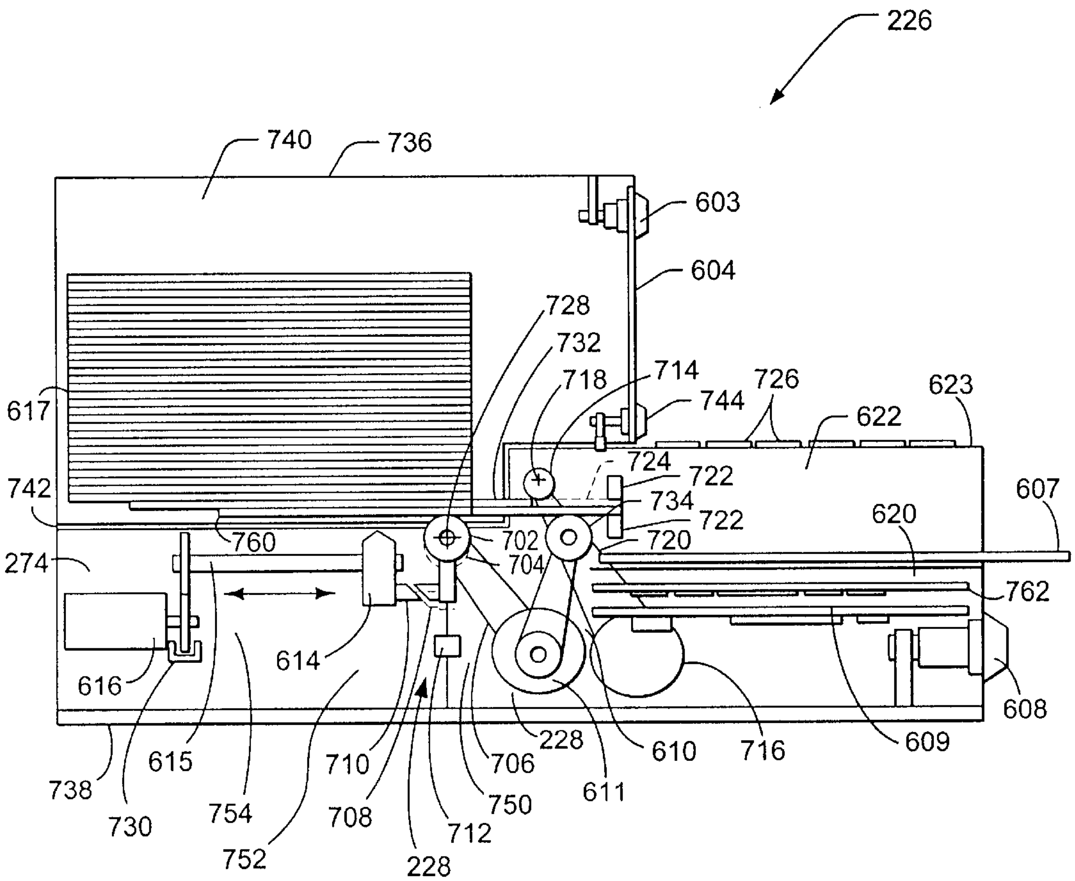
FIG. 7 is a diagram showing a schematic view of an second exemplary embodiment of the scrip dispensing device.

FIG. 7 is a diagram of an alternative embodiment of the scrip dispensing unit and related elements. As can be appreciated, scrip that has been dispensed and inserted into other gaming devices 104 must be periodically replaced. To make this replacement more convenient and more secure, the scrip dispensing device 226 shown in FIG. 7 includes a cassette unit 736 which has an interface 742 adapted for releasable coupling with a scrip dispensing module 738. The scrip dispensing module 738 houses the scanner 274, the scrip dispensing unit 228, the interface module 218 and the local computer 232. The cassette has a plurality of surfaces forming a cavity 740 therein for storing the scrip. The cassette can be secured to the scrip dispensing module 738 by a cassette locking mechanism 744.

The scrip dispensing module 738 comprises one or more engagement wheels 702. These engagement wheels 702 rotate about an engagement wheel axis 728 and are nominally held in a first (non-engagement) position (indicated by dashed lines 704) by a spring 712. However, the engagement wheels 702 can be vertically displaced to a second (engagement) position (shown by solid lines 702) by a force sufficient to overcome the retention force of the spring 712 and the mass of the engagement wheels 702 and related assemblies. The optical barcode reader sensor 614 comprises an extension member 710 which slidably engages a corresponding member 708 physically contacting the engagement wheel assembly 750 when the sensor 614 is disposed proximate to a first position 752, but which does not physically contact the engagement wheel assembly 750 when the sensor 614 is disposed in a position not proximate to the first position 752 (such as second position 754). Slidable coupling between the member 710 and corresponding member 708 vertically displaces the engagement wheel 702 assembly, hence moving the engagement wheel axis 728 from the non-engagement position 704 to the engagement position 702. When in the engagement position, the engagement wheels 702 contact the bottom side of the bottom scrip card 760, and urges the scrip card in a dispensing direction (towards the channel 622).

This design has a number of advantages. First, it eliminates the need for a separate solenoid 613 to move the engagement wheel 702, and all of the logic and circuitry necessary to operate the solenoid 613. It also prevents the engagement wheel 702 from dispensing any scrip 617 until the barcode reader sensor 614 has finished scanning the barcode on the scrip, thus reducing the possibility of prematurely dispensing scrip. Finally, this design also permits more precise control over the precise location of the engagement wheels 702 and the force they apply to the scrip. To control the position of the engagement wheels 702, the motor is augmented with a rotation measuring device 730 such as a shaft encoder. Using the data from the shaft encoder, the precise position of the optical barcode reader sensor (and hence, the engagement wheels) can be ascertained and controlled. This permits the position of the engagement wheels 702 to be varied as desired to assure that the scrip is dispensed with as few errors as possible. It is also possible to vary the position of the engagement wheels to account for different scrip parameters (including thickness and composition), or to account for an estimate of the number of scrip units remaining in the dispenser (and hence the weight on the bottom card 760).

After the engagement wheels 702 make contact with the bottom scrip card 760, motor 611 provides motive torque to the an engagement wheel 702 via the drive belt 706. This moves the scrip in a dispensing direction. Dispensing wheels 734 urge the scrip card into the channel 622.

The foregoing mechanical structure must be capable of reliably dispensing a single scrip unit, regardless of how many scrip units have been loaded into the unit. When a large number of scrip units have been loaded into the scrip dispensing unit, there is the possibility that friction between the bottom scrip card 760 and the card above it 732 will cause more than one scrip card to be translated by the engagement wheel 702. To prevent the unwanted scrip card 732 from being dispensed into the channel 622, a stripper cam 714 is provided. Nominally, the stripper cam 714 rotates about an stripper cam axis 718 in the same direction as the engagement wheels 702 (illustrated in the clockwise direction). However, since the stripper cam is disposed on the opposite side of the scrip card, the stripper cam provides a force tending to urge scrip cards in a retract direction. In one embodiment of the invention, the maximum radial extent of the stripper cam 714 from the stripper cam axis 718 is such that it will not contact a single scrip card being urged in the dispensing direction (towards the channel 622), but will contact the top of a second scrip 732, should one be inadvertently translated by the engagement wheel 702 in the dispensing direction. The exterior surface of the stripper cam 714 can be made of rubber or hard plastic.

In the illustrated embodiment, the stripper cam axis 718 is offset so that the outer surface of the stripper cam 714 intermittently contacts the upper surface of the second scrip 732 to urge it in the retract direction (opposing that of the dispensing direction), and prevent the second scrip from passing by the stripper cam 714.

It is possible that the friction between the second scrip card 732 and the outside surface of the stripper cam 714 will be inadequate to prevent the second scrip card 732 from passing by the stripper cam 714. Even if dispensed, the second scrip card 732 should be useless, since the pre-coded information on the second scrip card 732 has not been read and passed to the intranet server 108 for activation. Nonetheless, to prevent waste and possible jamming of the scrip dispenser, it is desirable to prevent multiple cards from being dispensed.

If the urging force provided by the stripper cam 714 is insufficient to prevent the second scrip card 732 from entering the channel 622, the presence of the scrip card (now referred to as an extended second scrip card 724) will be sensed by a scrip sensor 722. In one embodiment of the present invention, the scrip sensor 722 is an optical sensor, which determines the opacity of the material passing between an irradiating source and a receiver sensor. The measured opacity is monitored by the local computer 232. If the opacity indicates that more than one scrip card is being dispensed, the local computer 232 commands the scrip dispensing unit 228 to self correct by moving the scrip cards (both the bottom card 760 and the second card 732) in a retract direction. This is accomplished by reversing the rotation of the engagement wheels 702 and the dispensing wheels 734. The rotation direction of the stripper cam 714, however, is not reversed, since it is desirable to have the stripper cam 714 continue to urge any scrip in the retract direction. Since the stripper cam 714 must be capable of rotating in either the same direction as the engagement wheels, a second motor 716, which is separately controllable from the first motor 611 is provided. Using the second motor belt 720, the second motor 716 can turn the stripper cam 714 in either the clockwise or the counter clockwise direction, as commanded by the local computer 232. In an alternative embodiment, changes in the direction of the rotation of the stripper cam 714 can be implemented by a simple gear box, or reversing gear.

Dispensed scrip card 607 passes through channel 622 formed between lower shelf 620 and upper shelf 623. After the scrip is distributed, the computer 232 can activate visual display elements 726 to indicate to the user that scrip has been dispensed. Also, using the interface module 218 located on the system I/O (SIO) card 218, the computer 232 may interrupt the signal on the audio communication path 212E, and substitute another signal indicating that the scrip has been dispensed. Alternatively, an audio signal indicating that the scrip has been distributed can be added to the audio signal.

In the illustrated embodiment, the SIO card 762 is physically distinct from the logic PC board 609, which implements the local computer 232. Gaming device 104 design can vary widely from manufacturer to manufacturer, and from year to year. Hence, it is desirable that the gaming machine 104 interface be as flexible as possible. This is accomplished by segmenting the functions of the interface module 218 and the local computer 232 into an SIO card 762 and a physically distinct logic PC board 609. Since a given local computer 232 is typically capable of adapting to a wide variety of devices and I/O interfaces, the same logic PC board 609 can be used for virtually any gaming device 104. At the same time, the SIO card 762 can be designed to include only those elements (isolators, relays, etc) that are needed to interface with each particular gaming device 104. Further, the interface between the SIO card 762, the local computer 232 and other elements can be designed to permit the SIO to be readily installed and removed as required (i.e. plug-in compatibility).

Although it is advantageous to separate the functionality of the local computer 232 and the interface module 218 into physically distinct and removable cards, the present invention can be practiced with a general purpose SIO card 762 that applied to all or virtually all gaming devices. For that matter, the functions performed by the interface module, the local computer 232, and other elements in the scrip dispensing device 226 can be implemented on a single card, if desired.

In another embodiment, a sensor can be placed in the channel 622 to indicate whether the dispensed scrip has been removed. If the sensor indicates that the scrip has not been removed and the gaming machine 104 has remained inactive for a period of time (determined by measuring signals from the existing I/O devices), the local computer 232 may send a message to the intranet computer to categorize the dispensed scrip as unclaimed.

Figure 8C:
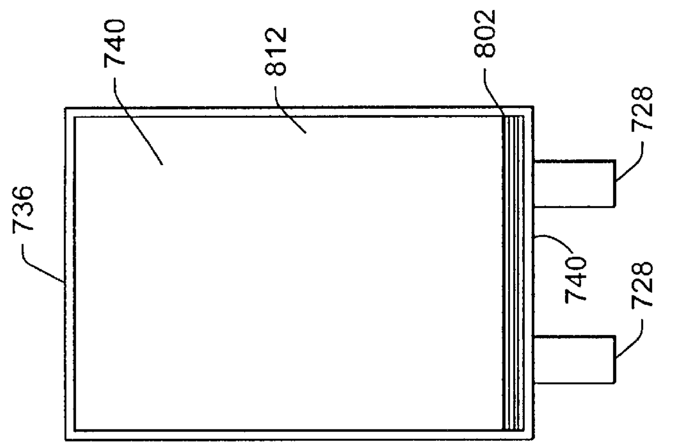
FIG. 8 is a diagram showing a schematic view of one embodiment of the cassette.
Figure 8A:
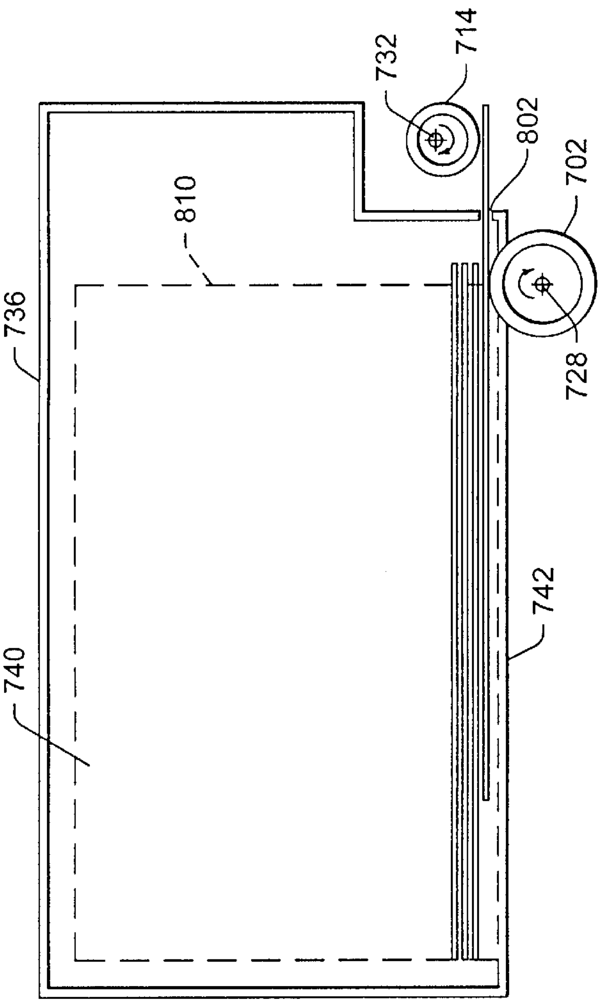
Figure 8B:
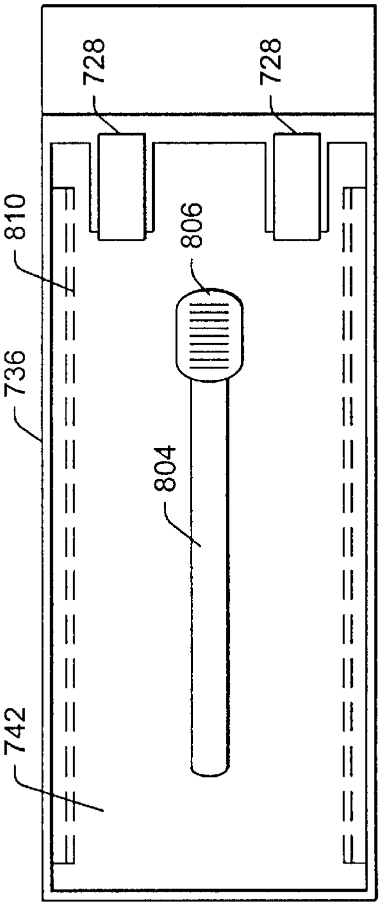

FIG. 8 is a diagram showing one embodiment of the cassette 736. The cassette 736 comprises an first aperture 802 through which the scrip cards are dispensed, and a second aperture 804, which is positioned adjacent the barcode reader sensor 614 so that the barcode reader sensor 614 can scan the bar codes on the downward facing side of the scrip cards. The cassette 736 interface 742 also comprises a unique cassette code 806. In the illustrated embodiment, the cassette code is manifested by a bar code disposed adjacent to the second aperture 804. Under command of the local computer 232, the barcode reader sensor 614 can read the cassette code, and determine which cassette is attached to the scrip dispensing module 738. This information can be relayed to the Internet server 108 for tracking the distribution of scrip in each of the gaming devices 104.

Since the number of scrip cards in the cassette 736 may be in the order of 1000 cards or more, weight placed upon the bottoms scrip card 760 may vary substantially. To reduce this variance, and to permit more predictable dispensing of the scrip cards, one or more of the interior surfaces of the cassette 736 may also comprise modified surface 810 to assist in the dispensing of the scrip cards.

Figure 9B:
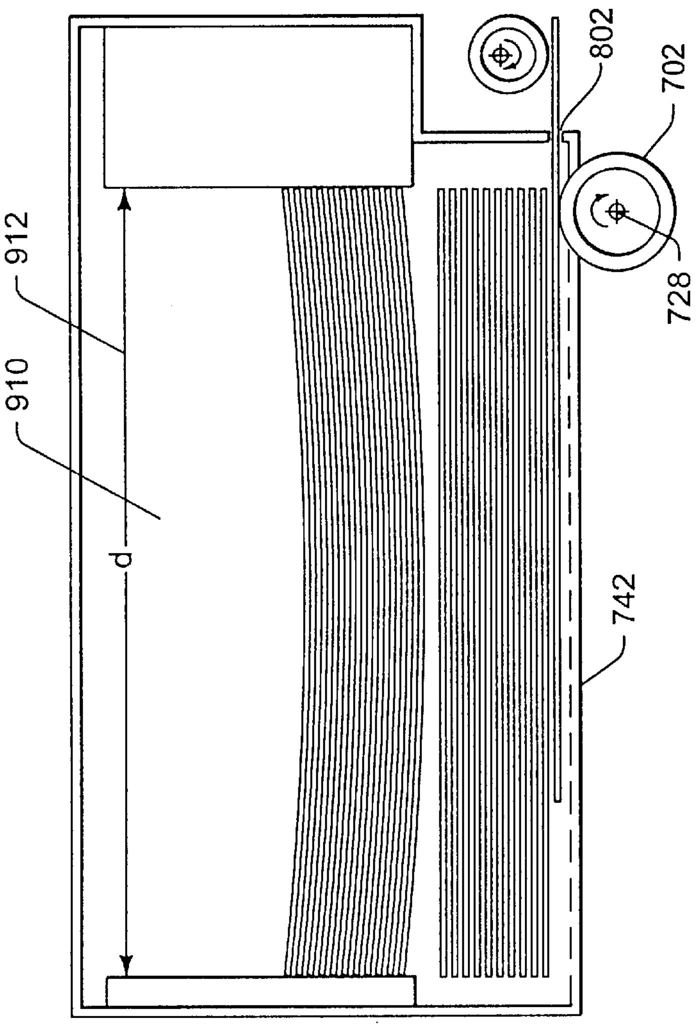
FIGS. 9A and 9B are diagrams showing additional embodiments of the cassette.
Figure 9A:
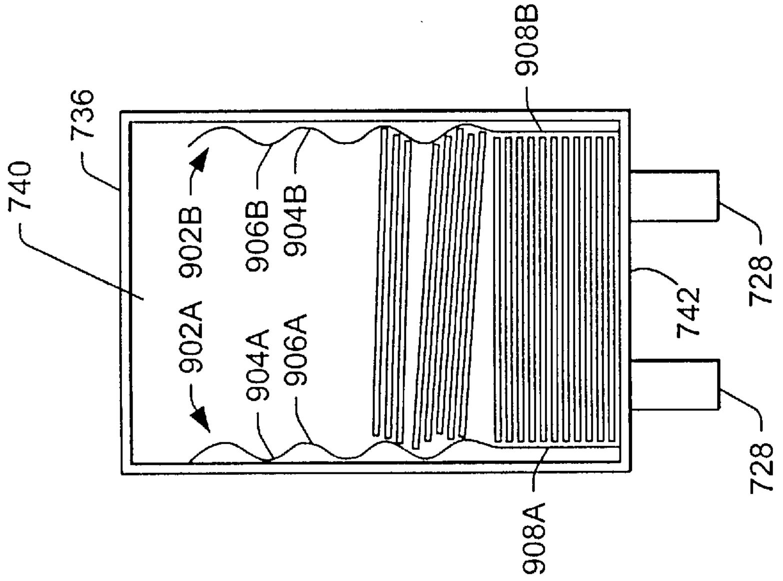

FIG. 9A is a diagram showing one embodiment of the modified surface 810. In this embodiment, the modified surfaces comprise a first vertical interior surface 902A having undulations including a peak undulation 904A and a trough undulation 906A. Opposing the first interior surface 902A on the other side of the scrip cards, is a second vertical interior surface 902B having a undulations including a peak undulation 906B and a trough undulation 904B. In one embodiment, the undulations in the first interior surface 902A and the second interior surface 902B are in phase. That is, the peak undulation 906A of the first interior surface 902A is oppositionally disposed from the trough 906B of the second interior surface 902B. Non-undulating surfaces 909A and 908B are disposed below the undulations in the interior surfaces 902A and 902B, and proximate the interface 742. The foregoing structure relieves some of the weight imposed on the bottom scrip card 760, allowing the scrip cards to be more predictably dispensed one at a time.

FIG. 9B is a diagram showing another embodiment of the modified surface 810. In this embodiment, an upper portion of the cavity 740 comprises a narrowed portion 910. The distance from opposing surfaces of the narrowed portion 910 is less than the dimension of the scrip card. Hence, the scrip cards bow downwards as shown in FIG. 9B. Friction between the edges of the scrip cards and opposing surfaces of the cavity 740 in the narrowed portion relieve some of the weight applied to the bottom scrip card 760.

Figure 10A:
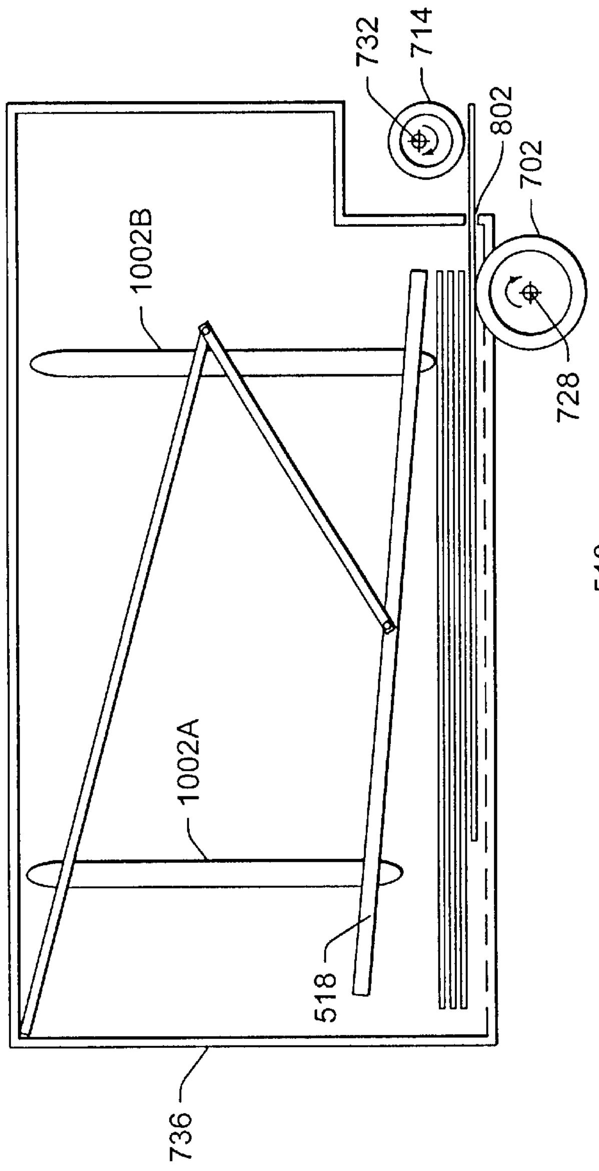
FIG. 10 is a diagram showing a further embodiment of the cassette.
Figure 10B:
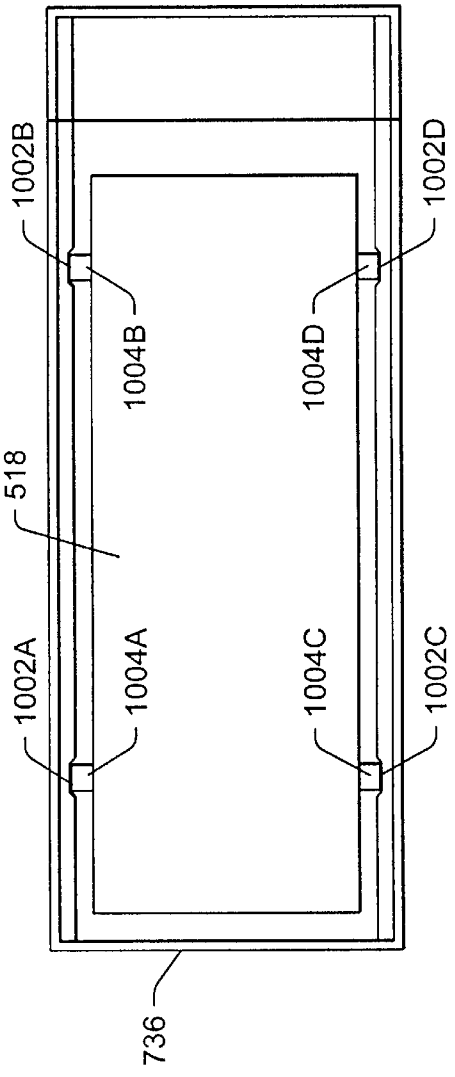

FIG. 10 is a diagram illustrating another embodiment of the cassette 736. In this embodiment, guides 1002A–1002D are disposed in the interior surface of the cassette 732. The guides (collectively referred to hereinafter as guides 1002) cooperatively interact with guide pins 1004A–1004D on the weight 518. The lowest extent of the second guide 1002B, disposed nearer to the aperture 802 extends below the lowest extent of the first guide 1002A, which tilts the weight 518 as the last few scrip cards are dispensed. This applies additional weight to the bottom scrip card 760 near the engagement wheel 702.

CONCLUSION

This concludes the description of the preferred embodiments of the present invention. In summary, the present invention discloses a method, apparatus, and article of manufacture for dispensing pre-coded scrip. The method comprises the steps of accepting a cashout command at a gaming device, scanning a code on the pre-coded scrip in response to the cashout command, transmitting the code to a remote processor having access to a database for storing and retrieving codes from a plurality of gaming devices, receiving a scrip dispense message from the remote processor, and dispensing the pre-coded scrip. The article of manufacture comprises a data storage device tangibly embodying instructions to perform the method steps described above. One embodiment of the apparatus comprises a scanner for scanning a code on a pre-coded scrip, a scrip dispensing unit for emitting or issuing the scrip to the user, and a processor. The processor is communicatively coupled to the gaming device, the scanner, the scrip dispensing unit, and a remote processor which has access to a database for storing and retrieving codes from a plurality of gaming devices. The processor comprises instructions for transmitting a first message comprising the scanned code to the remote processor and for receiving a second message comprising a scrip dispense message from the remote processor. Another embodiment of the apparatus comprises a cassette, having a plurality of surfaces forming a cavity therein for storing scrip, and an interface disposed on at least one of the plurality of surfaces, wherein the interface is adapted for releaseably coupling the cassette to the scrip dispensing device.

The disclosed system and method avoids expensive self authenticating currency substitutes or devices to read them, and can therefore be inexpensively distributed in all gaming devices in a casino.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by the details of the embodiments presented in this description. The above specification, examples, and data provide a complete description of the manufacture and use of the invention. Many embodiments of the invention can be made without departing from the spirit and scope of the invention.

What is claimed is:

1. A method for dispensing pre-coded scrip, comprising the steps of:

(a) accepting a cashout command at a gaming device;

(b) scanning a code on the pre-coded scrip in response to the cashout command, wherein the code uniquely identifies the scrip;

(c) transmitting the code to a remote processor having access to a database for storing and retrieving codes from a plurality of gaming devices;

(d) receiving a scrip dispense message from the remote processor; and (e) dispensing the pre-coded scrip.

2. The method of claim 1, wherein the remote processor further has access to a plurality of valid codes, and the scrip dispense message is received from the remote processor if the transmitted code is one of the valid codes.

3. The method of claim 1, wherein the cashout command is associated with a cashout value $K_{co}$, the pre-coded scrip is associated with a predetermined scrip value $K_s$, and the method further comprises the steps of:

(f) determining a decremented cashout value $K_{co}'$ as $K_{co}-K_s$;

(g) dispensing an additional pre-coded scrip by repeating steps (b)–(e) if the $K_{co}' \geqq K_s$; and (h) repeating steps (f) through (g) until $K_{co}' < K_s$.

4. The method of claim 3, wherein the gaming device further comprises the step of dispensing a number of coins collectively having a value substantially equal to $K_{co}'$.

5. The method of claim 1, wherein the cashout command is associated with a cashout value $K_{co}$, the pre-coded scrip is associated with a predetermined scrip value $K_s$, and the method further comprises the step of dispensing m pre-coded scrips wherein m is the largest integer satisfying $K_{co}=mK_s+K_{rem}$.

6. The method of claim 5, further comprising the steps of dispensing a number of coins collectively having a value substantially equal to $K_{rem}$.

7. The method of claim 1, further comprising the step of activating the scrip code in a database accessible by the remote processor.

8. The method of claim 1, wherein the dispensed pre-coded scrip is associated with a predetermined scrip value $K_s$, and the method further comprises the steps of:

accepting the dispensed pre-coded scrip in a second gaming device;

scanning the code on the dispensed pre-coded scrip transmitting the scanned code to the remote processor;

receiving a credit message from the remote processor; and providing a number of credits associated with the predetermined scrip value $K_s$.

9. The method of claim 8, wherein the remote processor further has access to a plurality of valid codes, and the step of receiving a credit message from the remote processor is performed only if the scanned code is a valid code.

10. The method of claim 1, further comprising the steps of:

reading a cashout balance from the gaming device;

transmitting the cashout balance to the remote processor; and storing the cashout balance in the database.

11. The method of claim 10, further comprising the steps of:

accepting the dispensed pre-coded scrip in a second gaming device;

scanning the code on the dispensed pre-coded scrip;

transmitting the scanned code to the remote processor;

receiving a credit message from the remote processor, the credit message describing the cashout balance; and providing a number of credits on the second gaming device corresponding to the cashout balance.

12. The method of claim 1, wherein the gaming device comprises a payout device for dispensing coin, and the method further comprises the steps of:

intercepting the cashout command at the gaming device;

disabling the payout device;

determining the cashout value as a combination of number of scrip and a number of coins;

providing a message indicative of the number of coins to the payout device; and activating the payout device to dispense the number of coins.

13. The method of claim 1, further comprising the step of scanning a manifestation of a cassette code, and transmitting the cassette code to the remote processor.

14. An apparatus for selectively dispensing pre-coded scrip, comprising:

a scanner for scanning a code on the pre-coded scrip in response to a cashout command;

a scrip dispensing unit for emitting the scrip; and a processor, communicatively coupled to a gaming device, the scanner, the scrip dispensing unit, and a remote processor having access to a database for storing and retrieving codes from a plurality of gaming devices, the processor for transmitting a first message comprising the scanned code to the remote processor and for receiving a second message comprising a scrip dispense message from the remote processor.

15. The apparatus of claim 14, wherein the scrip dispensing unit further accepts the scrip, and the processor further receives a credit message from the remote processor.

16. The apparatus of claim 14, wherein the gaming device comprises a plurality of existing I/O devices, and the processor is communicatively coupled to at least one of the plurality of existing I/O devices to selectively monitor, interrupt, and modify signals from the existing I/O devices.

17. The apparatus of claim 16, wherein the existing I/O devices includes a payout device responsive to an activation signal and a credit signal, and wherein the processor is communicatively coupled to the payout device to interrupt and modify the activation signal and the credit signal.

18. The apparatus of claim 14, wherein the gaming device is adapted to releasably couple to a cassette for supplying scrip for scanning by the scanner and dispensing by the scrip dispensing unit.

19. The apparatus of claim 18, wherein the cassette further comprises a manifestation of a cassette code readable by the scanner when the cassette is coupled to the device.

20. The apparatus of claim 19, wherein the first message further comprises the manifestation of the cassette code.

21. A apparatus for supplying scrip to a scrip dispensing device, comprising:

a cassette, having a plurality of surfaces forming a cassette cavity therein for storing the scrip; and an interface, disposed on at least one of the plurality of surfaces the interface adapted for releasably coupling the cassette to the scrip dispensing device;

wherein the cassette cavity further comprises a first interior surface having first undulations and an opposing second interior surface having second undulations.

22. The apparatus of claim 21, wherein the first undulations are substantially in phase with the second undulations.

23. The apparatus of claim 22, wherein the first interior surface and the second interior surface are disposed so as to accept and contact the script therebetween.

24. The apparatus of claim 22, wherein the first interior surface comprises a non-undulating portion and the second interior surface comprises a non-undulating portion disposed proximate the interface.

25. An apparatus for supplying scrip to a scrip dispensing device, comprising:

a cassette, having a plurality of surfaces forming a cassette cavity therein for storing the scrip;

an interface, disposed on at least one of the plurality of surfaces the interface adapted for releasably coupling the cassette to the scrip dispensing device; and wherein the scrip comprises a first edge and an opposing second edge separated by a first dimension, and wherein an upper portion of the cavity comprises a narrowed portion having a dimension less than the first dimension.

26. An apparatus for supplying scrip to a scrip dispensing device, comprising:

a cassette, having a plurality of surfaces forming a cassette cavity therein for storing the scrip;

an interface, disposed on at least one of the plurality of surfaces the interface adapted for releasably coupling the cassette to the scrip dispensing device; and wherein:

the scrip dispensing device comprises a scanner for scanning a code on the pre-coded scrip; and the interface comprises an aperture exposing the code to the scanner.

27. The apparatus of claim 26, wherein the interface further comprises a manifestation of a cassette code readable by the scanner when the cassette is coupled to the scrip dispensing device.

28. An apparatus for dispensing pre-coded scrip, comprising:

means for accepting a cashout command at a gaming device;

means for scanning a code on the pre-coded scrip in response to the cashout command, wherein the code uniquely identifies the scrip;

means for transmitting the code to a remote processor having access to a database for storing and retrieving codes from a plurality of gaming devices;

means for receiving a scrip dispense message from the remote processor; and means for dispensing the pre-coded scrip.

29. The apparatus of claim 28, wherein the remote processor further has access to a plurality of valid codes, and the scrip dispense message is received from the remote processor if the transmitted code is one of the valid codes.

30. The apparatus of claim 28, wherein the cashout command is associated with a cashout value $K_{co}$, the pre-coded scrip is associated with a predetermined scrip value $K_s$, the apparatus further comprising:

means for determining a decremented cashout value $K_{co}'$ as $K_{co}-K_s$;

means for dispensing an additional pre-coded scrip by repeating steps (b)–(e) if the $K_{co}' \geqq K_s$; and means for repeating steps (f) through (g) until $K_{co}' < K_s$.

31. The apparatus of claim 30, wherein the gaming device further comprises means for dispensing a number of coins collectively having a value substantially equal to $K_{co}'$.

32. The apparatus of claim 29, wherein the cashout command is associated with a cashout value $K_{co}$, the pre-coded scrip is associated with a predetermined scrip value $K_s$, and the apparatus further comprises means for dispensing m pre-coded scrips wherein m is the largest integer satisfying $K_{co}=mK_s+K_{rem}$.

33. The apparatus of claim 32, further comprising means for dispensing a number of coins collectively having a value substantially equal to $K_{rem}$.

34. The apparatus of claim 28, further comprising means for activating the scrip code in a database accessible by the remote processor.

35. The apparatus of claim 28, wherein the dispensed pre-coded scrip is associated with a predetermined scrip value $K_s$, and the apparatus further comprises:

means for accepting the dispensed pre-coded scrip in a second gaming device;

means for scanning the code on the dispensed pre-coded scrip means for transmitting the scanned code to the remote processor;

means for receiving a credit message from the remote processor; and means for providing a number of credits associated with the predetermined scrip value $K_s$.

36. The apparatus of claim 35, wherein the remote processor further has access to a plurality of valid codes, and the credit message is received from the remote processor only if the scanned code is a valid code.

37. The apparatus of claim 28, further comprising:

means for reading a cashout balance from the gaming device;

means for transmitting the cashout balance to the remote processor; and means for storing the cashout balance in the database.

38. The apparatus of claim 37, further comprising:

means for accepting the dispensed pre-coded scrip in a second gaming device;

means for scanning the code on the dispensed pre-coded scrip;

means for transmitting the scanned code to the remote processor;

means for receiving a credit message from the remote processor, the credit message describing the cashout balance; and means for providing a number of credits on the second gaming device corresponding to the cashout balance.

39. The apparatus of claim 29, wherein the gaming device comprises a payout device for dispensing coin, and the apparatus further comprises:

means for intercepting the cashout command at the gaming device;

means for disabling the payout device;

means for determining the cashout value as a combination of number of scrip and a number of coins; and means for providing a message indicative of the number of coins to the payout device; and activating the payout device to dispense the number of coins.

40. The apparatus of claim 28, further comprising:

means for scanning a manifestation of a cassette code; and means for transmitting the cassette code to the remote processor.

41. A program storage device, readable by a computer, tangibly embodying at least one program of instructions executable by the computer to perform method steps of dispensing pre-coded scrip, the method steps comprising the steps of:

(a) accepting a cashout command at a gaming device;

(b) scanning a code on the pre-coded scrip in response to the cashout command, wherein the code uniquely identifies the scrip;

(c) transmitting the code to a remote processor having access to a database for storing and retrieving codes from a plurality of gaming devices;

(d) receiving a scrip dispense message from the remote processor; and (e) dispensing the pre-coded scrip.

* * * * *